United States Patent
Soccol et al.

(10) Patent No.: US 11,525,793 B2
(45) Date of Patent: Dec. 13, 2022

(54) CMOS COMPATIBLE DEW POINT SENSOR DEVICE AND METHOD OF DETERMINING A DEW POINT

(71) Applicant: Sciosense B.V., AE Eindhoven (NL)

(72) Inventors: Dimitri Soccol, Rotselaar (BE); Viet Nguyen Hoang, Lueven (NL); David Van Steenwinckel, Holsbeek (BE); Roel Daamen, Herkenbosch (NL); Pascal Bancken, Opwijk (BE)

(73) Assignee: SCIOSENSE B.V., AE Eindhoven (NL)

( * ) Notice: Subject to any disclaimer, the term of this patent is extended or adjusted under 35 U.S.C. 154(b) by 40 days.

(21) Appl. No.: 17/225,670

(22) Filed: Apr. 8, 2021

(65) Prior Publication Data

US 2021/0223193 A1 Jul. 22, 2021

Related U.S. Application Data

(62) Division of application No. 16/079,080, filed as application No. PCT/EP2017/053923 on Feb. 21, 2017, now Pat. No. 11,002,696.

(30) Foreign Application Priority Data

Feb. 25, 2016 (EP) .................................... 16157384

(51) Int. Cl.
*G01N 25/68* (2006.01)

(52) U.S. Cl.
CPC .................................... *G01N 25/68* (2013.01)

(58) Field of Classification Search
USPC .................................................. 374/28, 184
See application file for complete search history.

(56) References Cited

U.S. PATENT DOCUMENTS

| 4,677,416 A | 6/1987 | Nishimoto et al. |
| 6,586,835 B1 | 7/2003 | Ahn et al. |
| 6,832,523 B2 | 12/2004 | Benzel et al. |

FOREIGN PATENT DOCUMENTS

| CN | 202049124 U | 11/2011 |
| CN | 102520015 A | 6/2012 |

(Continued)

OTHER PUBLICATIONS

Weremczuk, J.: "Dew/Frost Point Recognition With Impedance Matrix of Fingerprint Sensor" IEEE Transactions on Instruments and Measurement, vol. 57, No. 8, Aug. 2008, pp. 1791-1795.

(Continued)

*Primary Examiner* — Mirellys Jagan
(74) *Attorney, Agent, or Firm* — Slater Matsil, LLP

(57) ABSTRACT

In an embodiment a method includes determining, for each capacitor element of a plurality of capacitor elements of a capacitor, an increase of a capacitance of a capacitor element caused by a decrease of a temperature of the capacitor and deriving a dew point from a temperature at which the increases of the capacitances or values corresponding to the increases of the capacitances exceed a predefined limit by generating a set of binary digits, each of the binary digits corresponding to one of the capacitor elements and indicating whether the capacitance of the capacitor element is within a predefined range, comparing sets of binary digits generated at different temperatures and determining a number of capacitor elements for which the corresponding binary digits of the sets are different and repeating the comparison for a sequence of sets generated at decreasing temperatures.

9 Claims, 3 Drawing Sheets

(56) References Cited

FOREIGN PATENT DOCUMENTS

| | | |
|---|---|---|
| CN | 103743782 A | 4/2014 |
| CN | 103743783 A | 4/2014 |
| CN | 104655691 A | 5/2015 |
| DE | 3935610 A1 | 5/1991 |
| WO | 9605506 A1 | 2/1996 |
| WO | 2005100964 A1 | 10/2005 |

OTHER PUBLICATIONS

Savalli, N. el. al.: "Integrated CMOS dew point sensors for relative humidity measurement" Proceedings of SPIE vol. 5389, Jul. 29, 2004, pp. 422-430.

CMOS COMPATIBLE DEW POINT SENSOR DEVICE AND METHOD OF DETERMINING A DEW POINT

CROSS-REFERENCE TO RELATED APPLICATIONS

This is a divisional application of U.S. application Ser. No. 16/079,080, entitled "CMOS Compatible Dew Point Sensor Device and Method of Determining a Dew Point," which was filed on Aug. 22, 2018, which is a national phase filing under section 371 of PCT/EP2017/053923, filed Feb. 21, 2017, which claims the priority of European patent application 16157384.5, filed Feb. 25, 2016, all of which are incorporated herein by reference in its entirety.

BACKGROUND

The humidity of ambient air can be measured by a dew point sensor device. The dew point is the temperature at which water vapor in a sample of moist air at constant barometric pressure condenses into liquid water at the same rate at which it evaporates. At temperatures below the dew point, the rate of condensation is greater than the rate of evaporation, and the amount of liquid water increases. The condensed water is called dew when it forms on a solid surface. A measurement of the dew point includes detecting the onset of the formation of water droplets, which indicates a relative humidity of 100%, on a suitable surface while the temperature of the surface is being decreased and measured. The humidity of the air is derived from the dew point temperature.

Conventional dew point sensor devices comprise a mirror that can be cooled from a temperature above the dew point to a temperature below the dew point, in particular by means of a Peltier element. The reflectance of the mirror is monitored to detect the instant the mirror starts to mist up, and its temperature is simultaneously measured. A resistance temperature detector (RTD) like a platinum resistor (Pt1000) may be used for this purpose. An electric current depending on the reflectance of the mirror can be generated by a photodiode detecting a light ray that is reflected by the mirror. A second light ray of the same intensity, which is not attenuated by the condensed water, may serve as a reference to control the current of the Peltier element.

WO 96/05506 A1 discloses a dew point sensor comprising a miniature capacitor formed by interdigitated electrodes on the surface of a chip, a temperature sensor adjacent to the capacitor, a Peltier cooler arranged to cool the capacitor, and a microcontroller, which is arranged to control the Peltier cooler to maintain the temperature of the capacitor around the dew point and to measure variations in capacitance caused by condensation and evaporation of water on and from the capacitor electrodes.

U.S. Pat. No. 6,586,835 B1 discloses an integrated circuit package for providing heating or cooling to a semiconductor chip, which includes a Peltier element and does not require changes in CMOS processing techniques. A silicon interposer, which may include capacitors or driver circuits, carries a plurality of semiconductor chips mounted as flip chips. At least one of the chips is coupled to a metal-to-semiconductor junction or any other suitable Peltier junction.

U.S. Pat. No. 6,832,523 B2 discloses a dew point sensor comprising a semiconductor substrate and a diaphragm on the substrate. A region of porous material supports the diaphragm and insulates it thermally. A thermocouple, an interdigital capacitor, a Peltier element including p-doped and n-doped printed circuit traces and metal wires, and contact pads electrically connected to the terminals of the capacitor and the Peltier element are arranged on the diaphragm. The Peltier element is regulated so that the transition from the bedewed to the non-bedewed condition, or vice versa, can be determined by the change of the capacitance of the capacitor. The corresponding dew point is measured by means of the thermocouple.

SUMMARY

The dew point sensor device comprises a semiconductor substrate, a Peltier element, a temperature sensor and a capacitor. The Peltier element may be integrated in the substrate. The temperature sensor is arranged in the vicinity of the capacitor, so that the temperature of the capacitor can be measured at least approximately. The capacitor comprises a plurality of capacitor elements each having a capacitance. The capacitor elements are arranged at a surface above the substrate, so that they can be exposed to a gaseous medium or atmosphere. An electronic circuit, which may also be integrated in the substrate and which may especially comprise a CMOS circuit, is configured for an individual determination of the capacitances.

The electronic circuit is configured for a generation of a set of binary digits, each of the binary digits corresponding to one of the capacitor elements and indicating whether the capacitance of the capacitor element is within a predefined range. For each of the capacitor elements, the predefined range may especially include a capacitance of the capacitor element that is observed in a dry state of the capacitor.

In an embodiment of the dew point sensor device, the predefined range is selected so that any capacitance of one of the capacitor elements that differs at least by a factor of two from the capacitance of this capacitor element that is observed in the dry state is outside the predefined range.

In a further embodiment, the electronic circuit is further configured for a comparison of the set of binary digits generated at a first temperature with the set of binary digits generated at a second temperature, and for a determination of the number of capacitor elements for which the corresponding binary digits are different at the first temperature and the second temperature.

A further embodiment comprises a top layer arranged on the substrate, the top layer including a wiring of the integrated circuit. The capacitor is arranged at a surface of the top layer that faces away from the substrate.

A further embodiment comprises a cover layer arranged on the capacitor, the cover layer comprising a hydrophilic material.

The method of determining a dew point makes use of a capacitor comprising a plurality of capacitor elements each having a capacitance that is individually determined. For each of the capacitor elements, an increase of its capacitance caused by a decrease of the temperature of the capacitor is determined. The dew point is derived from a temperature at which the increases of the capacitances or values corresponding to the increases of the capacitances exceed a predefined limit.

For this purpose, a set of binary digits is generated, each of the binary digits corresponding to one of the capacitor elements and indicating whether the capacitance of the capacitor element is within a predefined range. Such sets of binary digits generated at different temperatures are compared, and the number of capacitor elements for which the corresponding binary digits of the sets are different is determined. The comparison is repeated for a sequence of such sets generated at decreasing temperatures until the increase of the numbers thus obtained exceeds a predefined limit.

In a variant of the method, the predefined range includes the capacitance of each capacitor element at a temperature of a dry state of the capacitor, and each set of the sequence of sets of binary digits is compared with a further set from the same sequence.

In further variants of the method, the sets of the sequence are compared with their immediate successors, or the comparisons of the sets are performed between sets that are separated within the sequence by a preselected number of intermediate sets.

In a further variant of the method, any capacitance that differs at least by a factor of two from the capacitance that is present in the same capacitor element at a temperature of a dry state of the capacitor is regarded as being outside the predefined range.

BRIEF DESCRIPTION OF THE DRAWINGS

In the following, embodiments and variants of the invention are described in more detail in conjunction with the accompanying figures.

DETAILED DESCRIPTION OF ILLUSTRATIVE EMBODIMENTS

Figure 1:
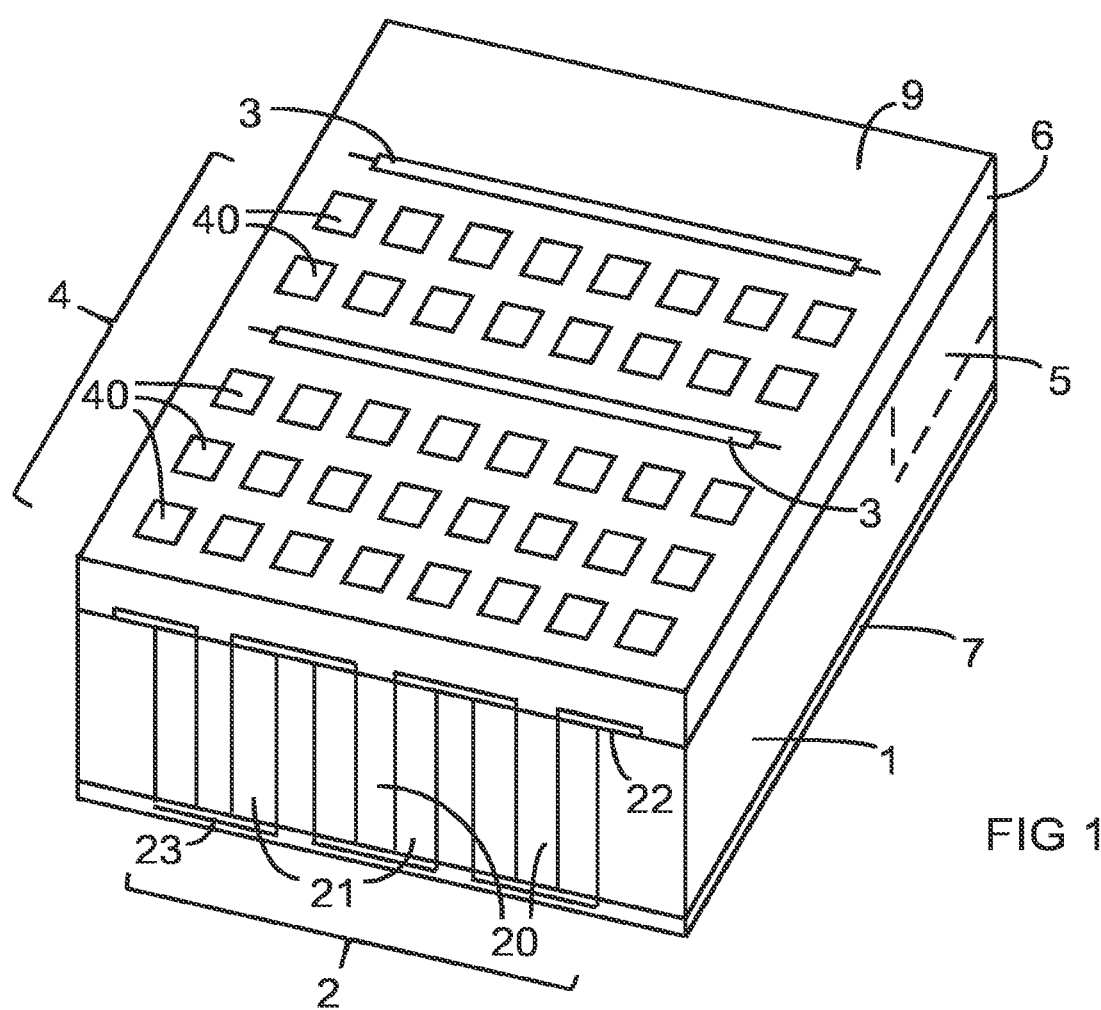
FIG. 1 shows an embodiment of the device.

FIG. 1 shows an inclined top view of an embodiment of the dew point sensor device. A semiconductor substrate 1 comprises a Peltier element 2, a temperature sensor 3, which may especially comprise at least one resistance temperature detector, for instance, a capacitor 4 and an integrated circuit 5, which may especially comprise a CMOS circuit, for instance.

The Peltier element 2 may comprise an arrangement of p-type regions 20 and n-type regions 21, which are alternatingly connected via an upper metal layer 22 and a rear metal layer 23. The structure of the Peltier element 2 is not restricted to the example shown in FIG. 1, but any structure selected from a variety of Peltier elements 2 known per se in the prior art may be appropriate.

A region where the integrated circuit 5 may be located is indicated in FIG. 1 by way of example. Although components of the integrated circuit 5 may generally be arranged anywhere in the substrate 1, they may particularly be arranged remote from the side of the Peltier element 2 where heat is generated, in order to secure correct operation and appropriate performance of the integrated circuit 5.

A top layer 6 may be arranged on a main surface of the substrate 1 and may be provided for a wiring, in particular a wiring according to standard CMOS technology. The top layer 6 may comprise metallization levels separated by intermetal dielectric, for instance, which may particularly include the upper metal layer 22.

A bottom layer 7 may be provided on the opposite rear main surface of the substrate 1. The bottom layer 7 may comprise dielectric material and/or at least one further metallization layer, which may particularly include the rear metal layer 23.

The capacitor 4 comprises a plurality of capacitor elements 40, which may be arranged in the form of an array. The capacitor elements 40 may be arranged at an exposed surface 9, which may be an upper surface of the top layer 6 facing away from the substrate 1, for instance. If a wiring is provided, the capacitor elements 4 may be formed by at least one metallization layer of the wiring, for instance.

The arrangement of the capacitor elements 40 allows water vapor from a gas atmosphere that is contiguous with the exposed surface 9, like ambient air, to condense on the capacitor elements 40, thus forming dew or tiny water droplets increasing the capacitances. The electronic circuit 5 is provided to determine the capacitances of the capacitor elements 40 individually and to evaluate them.

The temperature of the capacitor 4 is varied using the Peltier element 2 and can be measured by the temperature sensor 3, which is disposed in the vicinity of the capacitor 4.

When the temperature decreases from an initial temperature that is above the dew point, condensation of water occurs near the dew point temperature, and the capacitances of the capacitor elements 40 increase. When the dew point is reached or passed, which is indirectly detected by the measurement and evaluation of the capacitances, the temperature of the capacitor 4 is measured and serves to calculate the humidity of the surrounding gas atmosphere, according to the operation of conventional dew point sensors. The accuracy of the measurement is substantially increased by the use of a plurality of capacitor elements 40 and the individual determination of their capacitances.

The evaluation by the electronic circuit may include a generation of a set of binary digits, each of the binary digits corresponding to one of the capacitor elements 40 and indicating whether the capacitance of this capacitor element 40 is within a predefined range. The predefined range may especially include the capacitance that is present in a dry state of the capacitor 4. The predefined range may be defined by upper limits, which may be selected for each capacitor element 40 separately, or the upper limit of the predefined range may be the same for all capacitor elements 40. The upper limit of the predefined range may especially be selected to be a capacitance between the capacitance of a dry state of the capacitor element 40 and its capacitance at the dew point. The upper limit may especially be twice the capacitance of the dry state.

Figure 2:
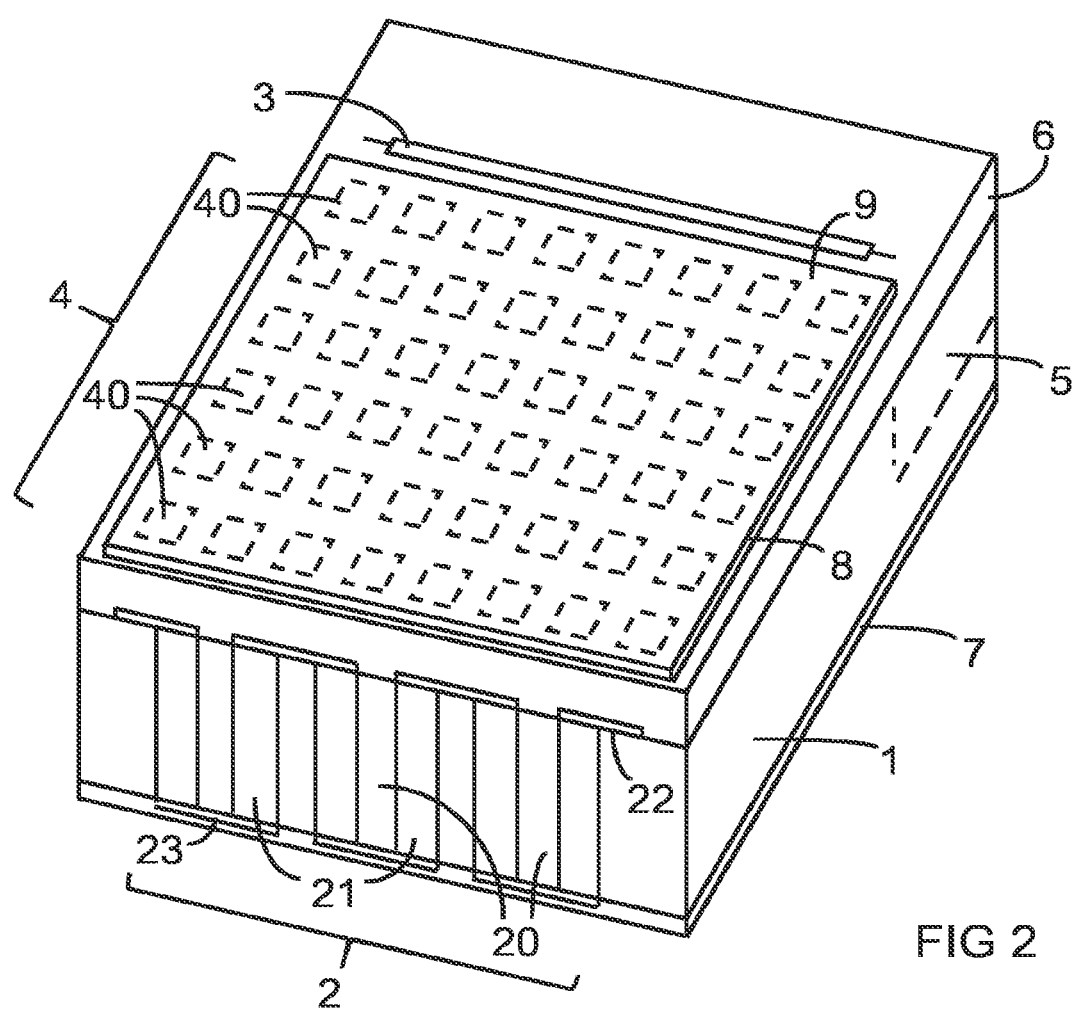
FIG. 2 shows a further embodiment of the device.

FIG. 2 shows an inclined top view of a further embodiment of the dew point sensor device. Elements of the further embodiment that correspond to elements of the embodiment according to FIG. 1 are designated with the same reference numerals. The embodiment according to FIG. 2 further comprises a cover layer 8 above the capacitor 4. The cover layer 8 may cover all the capacitor elements 40, as shown in FIG. 2, by way of example, or the cover layer 8 may instead be confined to the area of some of the capacitor elements 40. The cover layer 8 comprises at least a portion of the exposed surface 9 and is provided in such a manner that it enables an increase of the capacitances of the capacitor elements 40 that is due to the formation of dew. Hence the determination of the dew point is not inhibited by the cover layer 8.

Condensation requires a certain amount of supercooling, namely an additional temperature difference that is required for the formation of critical nuclei. This temperature difference depends on the contact angle between liquid water and the surface on which the dew is formed. The contact angle is smaller for a surface of hydrophilic material. Hence the temperature at which condensation occurs will be closer to the actual dew point temperature if the exposed surface 9 on which dew is to be formed comprises a hydrophilic material. If a cover layer 8 provides the exposed surface 9, the cover layer 8 may be formed from a hydrophilic material.

At very low humidity levels, the point of condensation becomes a frost point below 0° C. A surface of AgCl, for instance, is especially suitable for ice nucleation. Consequently, for special applications of the dew point sensor device, the exposed surface 9, and in particular the cover layer 8, may comprise AgCl.

A method of operating a dew point sensor device comprising a plurality of capacitor elements will be described in the following. Such a method can also be applied if the Peltier element and/or the electronic circuit is not integrated in the substrate carrying the capacitor elements.

Let n be the total number of capacitor elements 40 and the numbers from 1 to n be assigned to the capacitor elements 40 in any selected order and in one-to-one correspondence. Let $C_i(T)$ be the capacitance of the i-th capacitor element 40 at temperature T. Let $T_0$ be a temperature of a dry state of the capacitor 4 and $T_d$ a temperature corresponding to the dew point. The temperature $T_0$ is clearly above the dew point temperature $T_d$. In particular, apart from manufacturing tolerances, the capacitances $C_i(T)$ may be the same for each i with 1≤i≤n at a selected temperature T, which may especially be $T_0$.

Let $T_0=T_1>T_2>T_3> \ldots >T_{k-2}>T_{k-1}>T_k=T_d$ be a strictly decreasing sequence of temperatures. When the temperature decreases, the capacitances of the capacitor elements 40 are supposed to stay constant or increase when dew is formed. Hence $C_i(T_1) \leq C_i(T_2) \leq C_i(T_3) \leq \ldots \leq C_i(T_{k-2}) \leq C_i(T_{k-1}) \leq C_i(T_k)$ for each i with 1≤i≤n.

For each i, 1≤i≤n, a map $\beta_i$ from the set of positive real numbers r onto a set {a, b} may be defined by $\beta_i(r)=a$ if $r<C_i$, and $\beta_i(r)=b$ if $r \geq C_i$, where the capacitance $C_i$ is suitably selected in the range between $C_i(T_0)$ and $C_i(T_d)$. The ranges from 0 to $C_i$, for each i, define the preselected range. In the following description, a and b will be represented by 0 and 1, respectively, for sake of clarity.

In particular, $C_i$ may be defined as $f_i \cdot C_i(T_0)$ with suitable factors $f_i>1$. The map $\beta_i$ may be the same for each i, especially if the capacitances $C_i(T)$ are the same at a selected temperature T. The capacitances $C_i$ may be the same for each i, and in particular the factors $f_i$ may be the same. In practical applications, $f_i$ may typically be selected in the range from 2 to 3, for instance.

The method will be further described for the variant in which $\beta_1=\beta_2=\beta_3= \ldots =\beta_n-1=\beta_n$, $C_1=C_2=C_3 \ldots =C_{n-1}=C_n$. The map will be designated by $\beta$, and the capacitance defining the limit of the preselected range will be designated by C. The images of $C_1(T), C_2(T), C_3(T), \ldots C_{n-2}(T), C_{n-1}(T), C_n(T)$ under $\beta$ yield a set of n binary digits. Concatenation of these binary digits in the given order yields a bit string, which will be suitable for the following illustration of the method. The bit string is ideally 00000 . . . 00000 for $T=T_0$, and may be 11111 . . . 11111 or at least close to this value for $T=T_d$. Some of the binary digits may deviate if manufacturing tolerances are to be allowed for, or an approximate determination of the dew point is regarded as sufficient.

The bit strings thus obtained from the sequence of decreasing temperatures $T_0=T_1>T_2>T_3> \ldots >T_{k-2}>T_{k-1}>T_k=T_d$ are $\beta(C_1(T_1))|\beta(C_2(T_1))|\beta(C_3(T_1))| \ldots \beta(C_{n-2}(T_1))|\beta(C_{n-1}(T_1))|\beta(C_n(T_1))$ $\beta(C_1(T_2))|\beta(C_2(T_2))|\beta(C_3(T_2))| \ldots \beta(C_{n-2}(T_2))|\beta(C_{n-1}(T_2))|\beta(C_n(T_2))$ $\beta(C_1(T_3))|\beta(C_2(T_3))|\beta(C_3(T_3))| \ldots \beta(C_{n-2}(T_3))|\beta(C_{n-1}(T_3))|\beta(C_n(T_3))$ $\beta(C_1(T_k))|\beta(C_2(T_k))|\beta(C_3(T_k))| \ldots \beta(C_{n-2}(T_k))|\beta(C_{n-1}(T_k))|\beta(C_n(T_k))$. The concatenation of the binary digits is here indicated by the symbol "|".

A bit string of the form 00110001 . . . , for example, indicates that the capacitances of the first, second, fifth, sixth and seventh capacitor element 40, and so on in the selected order, are still below the limit C, and are possibly not far from the values $C_i(T_0)=1, 2, 5, 6, 7, \ldots$ ) of the dry state. This bit string further indicates that the capacitances of the third, fourth and eighth capacitor element 40, and so on, have already reached or exceeded the limit C, and have possibly approached the values $C_i(T_d)=3, 4, 8 \ldots$ ) of the dew point. The appearances of the binary digit "1" may be supposed to be due to the beginning condensation of water on the capacitor 4.

The evaluation of the sets of binary digits will be illustrated for an example of sets with n=20. The sequence of bit strings representing the sets may comprise, for instance, the following bit strings:

00000000000000000000 (first, corresponding to $T_1=T_0$)
00000000010000000000 (second, corresponding to $T_2<T_1$)
00000100010000000000 (third, corresponding to $T_3<T_2$)
00000100110010000000 (fourth, corresponding to $T_4<T_3$)
10010100110010000100 (fifth, corresponding to $T_5<T_4$)
11011101110110000110 (sixth, corresponding to $T_6<T_5$)
11111111111111111111 (seventh, corresponding to $T_7=T_d$)

If two bit strings of equal length are compared, the number of positions at which the corresponding digits of the bit strings differ, is called the Hamming distance. In the above example, the Hamming distance between the third bit string (3) and the fourth bit string (4) is 2, and the Hamming distance between the third bit string (3) and the sixth bit string (6) is 10, for instance.

The sequence of sets of binary digits generated for a plurality of temperatures may be evaluated by calculating the Hamming distances from the first set, for instances. As the first bit string of the above example is 00000000000000000000, these Hamming distances are here simply the number of digits "1" occurring in the following bit strings. When the temperature has sufficiently decreased and the capacitances have accordingly increased, the calculated Hamming distance exceeds a predefined limit, which is supposed to indicate that the dew point has been attained.

In the above example, the Hamming distances of the second to seventh bit string from the first bit string are 1, 2, 4, 7, 12 and 20. If the limit is set at 15 or 18, for example, the Hamming distance 20 of the seventh bit string indicates that the dew point is attained. If the limit is ½n=10, for example, the Hamming distance 12 of the sixth bit string will already be regarded as indicating a degree of condensation that corresponds to the dew point.

In another variant of the method, the Hamming distances may be calculated between successive sets of binary digits. In the above example, this calculation yields the following Hamming distances: 1, 1, 2, 3, 5 and 8. A substantial increase of the Hamming distances occurs at the Hamming distance 8 between the sixth bit string and the seventh bit string. Instead, the increase of the Hamming distance that occurs at the Hamming distance 5 between the fifth bit string and the sixth bit string may already be regarded as indicating a degree of condensation that corresponds to the dew point.

In another variant of the method, the Hamming distances may be calculated between sets of binary digits that are separated by a preselected positive number of sets within the sequence of sets. In particular, the preselected number may be fixed, so that the sets that are compared are always separated by the same number of intermediate sets within the sequence.

If in the above example the number is selected to be always 2, for instance, the Hamming distances between the first and fourth bit string, between the second and fifth bit string, between the third and sixth bit string, and between the fourth and seventh bit string are calculated, which yields the Hamming distances 4, 6, 10 and 16. A substantial increase of the Hamming distances occurs at the Hamming distance 16 between the fourth and seventh bit string. Instead, the increase of the Hamming distance that occurs at the Hamming distance 10 between the third and sixth bit string may already been regarded as indicating a degree of condensation that corresponds to the dew point.

Figure 3:
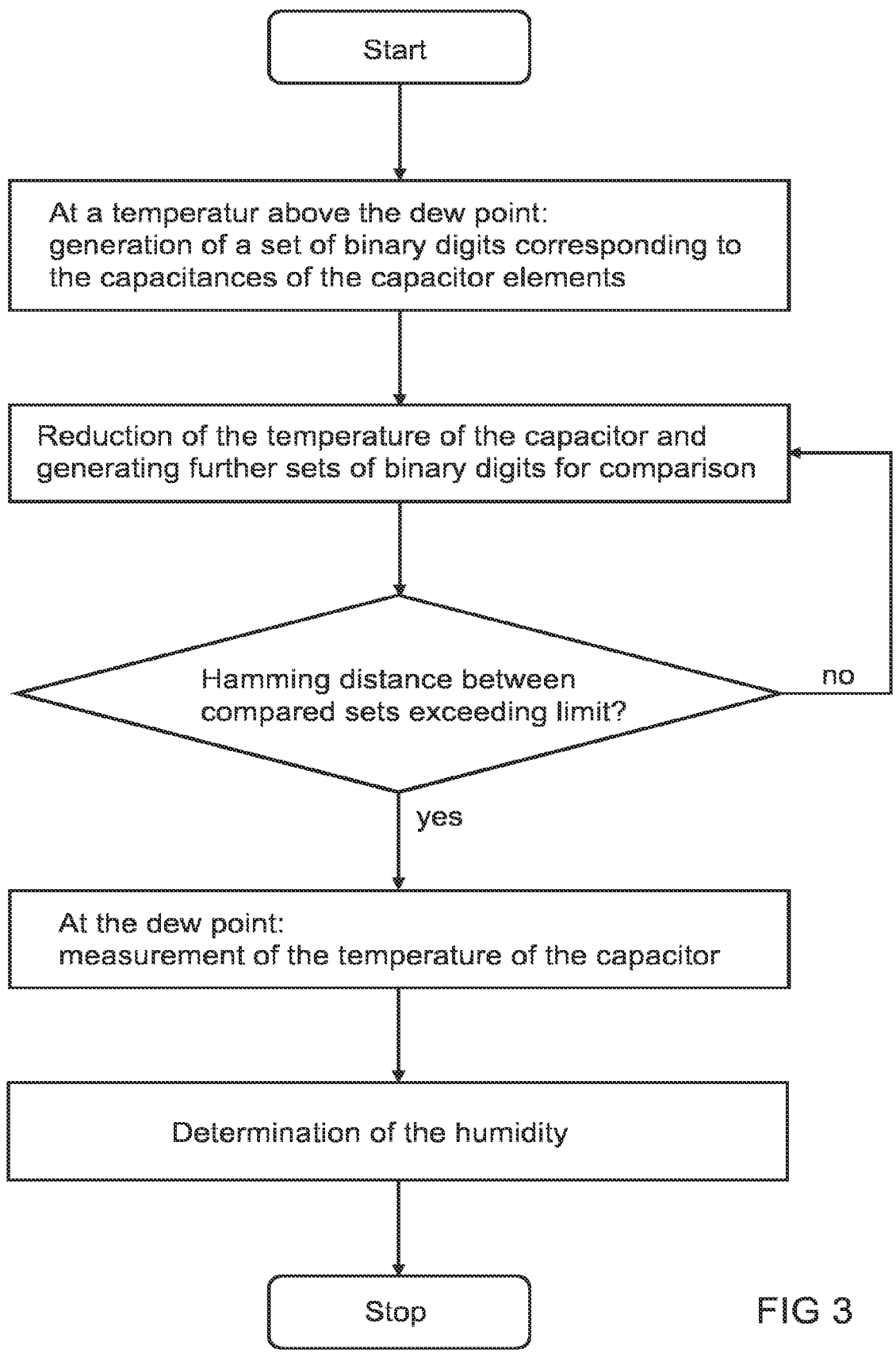
FIG. 3 is a flowchart for a variant of the method.

FIG. 3 is a flowchart for a variant of the method. FIG. 3 indicates only major steps of the method, which include an evaluation of Hamming distances until a predefined limit is reached.

The above example only serves to illustrate the method, which may be adapted according to the number n of capacitor elements 40, the capacitances in the dry state and/or at the dew point, the limits $C_i$ or factors $f_i$, the temperatures T for which the sets of binary digits are evaluated, and the degree of accuracy that is desired, as well as further aspects of individual applications of the method.

In a test, a dew point sensor device with an array of 128 by 128 capacitor elements was applied. At the start the dew point sensor device was at a temperature below the dew point temperature of 31.5° C., and condensed droplets were visible on the capacitor elements. During the time interval beginning 4.3 seconds after the start and ending 8.5 seconds after the start, the dew point sensor device was heated to temperatures above the dew point temperature, and the droplets disappeared. Then, 22 seconds after the start, the dew point sensor device was cooled, and condensation occurred again when the dew point temperature was reached and passed.

An algorithm using Hamming distances was employed for the evaluation of the measurements, which showed that the determination of the dew point could essentially be improved by this method. This was due to the fact that the calculated Hamming distances increased significantly above the noise level well before the droplets could be identified by a grey level diagram representing the measured capacitances. Thus a sensitive and fast detection of the dew point was feasible.

The use of a dew point sensor device comprising a plurality of capacitor elements and an electronic circuit provided for an individual determination of the capacitances and their comparison greatly improves the precision of the measurement. At the same time it allows a substantial reduction of the size of the dew point sensor device as compared to conventional dew point sensors.

The dew point sensor device facilitates a quick and accurate detection of the condensed water droplets, which may be smaller (typically <100 nm) than the optical limit of detection. It has the further advantages that it allows monitoring of possible contamination of the device and provides an easy regeneration of the initial state of the dew point sensor device.

What is claimed is:

1. A method for determining a dew point, the method comprising:
    determining, for each capacitor element of a plurality of capacitor elements of a capacitor, an increase of a capacitance of the capacitor element caused by a decrease of a temperature of the capacitor; and
    deriving the dew point from a temperature at which the increases of the capacitances or values corresponding to the increases of the capacitances exceed a predefined limit by:
    generating a set of binary digits, each of the binary digits corresponding to one of the capacitor elements and indicating whether the capacitance of the capacitor element is within a predefined range,
    comparing sets of binary digits generated at different temperatures and determining a number of capacitor elements for which the corresponding binary digits of the sets are different; and
    repeating the comparison for a sequence of sets generated at decreasing temperatures until an increase of the numbers thus obtained exceeds the predefined limit.

2. The method according to claim 1, wherein the sets of the sequence are compared with their immediate successor sets.

3. The method according to claim 1, wherein the comparisons of the sets are performed between sets that are separated within the sequence by a preselected positive number of intermediate sets.

4. The method according to claim 1, wherein any capacitance that differs at least by a factor of two from the capacitance that is present in the same capacitor element at a temperature of a dry state of the capacitor is regarded as being outside the predefined range.

5. The method according to claim 1, wherein the predefined range includes the capacitances of each capacitor element at a temperature of a dry state of the capacitor.

6. The method according to claim 5, wherein each set of the sequence is compared with a further set from the same sequence.

7. The method according to claim 1, wherein an electronic circuit provides the comparison of the set of binary digits.

8. The method according to claim 7, wherein the electronic circuit comprises a CMOS circuit.

9. The method according to claim 7, wherein the capacitances of the plurality of capacitor elements are individually determined using the electronic circuit.

* * * * *